United States Patent [19]

Meredith, deceased et al.

[11] 4,365,993
[45] Dec. 28, 1982

[54] RECOVERY OF COATED ALUMINIUM SCRAP

[76] Inventors: Francis M. P. Meredith, deceased, late of Banbury, England; by Priscilla J. Meredith, administratrix, 52 Beargarden Rd., Banbury, Oxfordshire, England

[21] Appl. No.: 226,698

[22] Filed: Jan. 21, 1981
(Under 37 CFR 1.47)

[30] Foreign Application Priority Data

Jan. 23, 1980 [GB] United Kingdom ............... 8002242

[51] Int. Cl.$^3$ ............................................. C22B 21/06
[52] U.S. Cl. ................................... 75/68 R; 75/44 S; 75/93 AC; 134/19
[58] Field of Search ................... 75/256, 257, 93 AC, 75/68 R, 44 S; 134/19

[56] References Cited

U.S. PATENT DOCUMENTS

| | | | |
|---|---|---|---|
| 1,291,672 | 1/1919 | Sutcliffe | 75/44 S |
| 3,649,247 | 3/1972 | Brondyke et al. | 75/68 R |
| 3,650,830 | 3/1972 | Mathis | 75/68 R |
| 3,924,035 | 12/1975 | Miller | 134/19 |
| 4,060,408 | 11/1977 | Kuhn | 75/68 R |

*Primary Examiner*—M. J. Andrews
*Attorney, Agent, or Firm*—Cooper, Dunham, Clark, Griffin & Moran

[57] ABSTRACT

In a process for recovering aluminium from lacquer-coated scrap a solution of a mixture of halide salts, which melts at a temperature of less than 710° C. is applied to the scrap before the lacquer coating of the scrap is pyrolyzed, preferably at a temperature of 400°–500° C. The salt mix acts as a flux and the burnt-off scrap yields a clean recovered metal relatively free from oxide inclusions. The preferred flux is a 50:50 mixture of sodium chloride and potassium chloride, with an optional addition of up to about 3% of an alkali metal fluoride.

4 Claims, No Drawings

RECOVERY OF COATED ALUMINIUM SCRAP

The present invention relates to recovery of aluminium (including aluminium alloys) from scrap aluminium which has been coated with an organic coating material.

It has been realised that the most effective way of recovering aluminium from such scrap is to burn off the organic coating from the scrap before remelting. It is found that excessive residual organic coating is deleterious and hinders the subsequent remelting of the scrap.

It is therefore essential to effect at least partial combustion of most, if not all, classes of lacquers and other coatings, such as are applied to aluminium sheet employed for packaging and other purposes.

If thermally decoated aluminium does not give rise to bubbling, flame or smoke or other obvious sign of the presence of volatiles when placed on or plunged into molten aluminium, it may be judged as being sufficiently decoated. It is however always preferable to burn off carbon residues in addition to pyrolysing the organic coating.

Large quantities of coated scrap arise in the production of aluminium containers, from scrap aluminium and from the use of painted aluminium sheet in building products.

In the course of burning off the organic coating material a proportion of the aluminium and of alloying constituents, particularly magnesium, become oxidised. This leads to loss of metal values and also introduces oxides into the metal in the course of remelting.

In conventional practice burning off organic coatings from aluminium scrap, such as scrap beverage cans, is effected by heating the baled scrap in an enclosed chamber to which air is admitted in controlled quantity. The temperature of the scrap is raised to a temperature below the melting point of the scrap, for example, 500°–600° C., at which it is held until the coating has been substantially removed. Thus the scrap may be held at the final temperature for up to 1 hour, but more usually 15–30 minutes. The outer portions of the bale are necessarily at temperature for longer periods.

In remelting scrap of the present type it is normal practice to plunge the burnt-off baled scrap into a body of already molten aluminium held in a remelting furnace. Where the scrap has been subjected to the conventional burning-off procedure outlined above, the amount of metal oxide introduced with the scrap is likely, in the case of Al-Mg alloy scrap, to be higher than in a normal scrap melting operation of uncoated scrap. In consequence the cleanliness of the metal (freedom from included oxide) is rather poor.

It has also been proposed to shred the baled scrap before burning-off, since this results in better exposure of the scrap to air and better heat exchange with hot gases, leading to more rapid and more complete burn-off of the coating.

It is already well known to carry out scrap melting operations in a reverberatory furnace under a cover flux to protect the surface of the molten aluminium from oxidation and to improve the separation of the molten metal from the dross layer which forms above it. When employing such a cover flux, which is commonly composed of equal amounts of sodium chloride and potassium chloride, it is usually found necessary to add it in an amount of at least 2% by weight of the scrap to be charged to the furnace, in order to obtain a dry dross which separates well from the molten metal. If the dross appears wet, more flux is added until the dross presents a dry appearance.

It has already been proposed in U.S. Pat. No. 3,649,247 to bring finely divided delacquered aluminium alloy scrap into contact with solid particles of a flux to precoat the scrap with flux before entry into a melting furnace. However that technique has proved to be quite unsatisfactory in relation to lacquered scrap. When a finely divided mixture of 50% KCl/50% NaCl was applied to lacquered sheet the adhesion was so low that no appreciable fluxing effect could be exercised by the adhering particles.

It is an object of the present invention to provide an improved procedure which may result in metal of greater cleanliness at the end of the remelting operation and render it unnecessary in most instances to filter the metal to achieve an acceptably low level of oxide inclusions.

The basic feature of the present invention is the deposition of a solution of fluxing salts on the surfaces of the coated scrap before burning-off. The fluxing salt solution is evaporated prior to or in the course of the burning-off operation, so that the salt can act as an in situ flux in subsequent melting. The deposited fluxing salt is found to provide very beneficial effects in the performance of the burning-off operation. In general, the fluxing salt consists of mixtures of two or more metal halide, usually chloride, salts, which mixtures melt at a temperature below 710° C. The amount of fluxing salt deposited on the surface of the scrap is dependent upon the concentration of the salt solution. In general, the strength of the salt solution should be at least 4% (total salts) in order to deposit sufficient fluxing salt on the surface of the coated scrap to function efficiently as a flux. A wide range of appropriate soluble fluxing salt mixtures have been identified which permit a 4% aqueous solution to be obtained. In some circumstances it is found desirable that the flux should contain a small amount of a fluoride, for example up to 10% of the flux. However to avoid "burning" of the dross, which occurs when excessive fluoride is present, it is desirable to limit the amount of added fluoride to about 5% of the fluxing salt mixture.

In the operation of the process of the present invention it is preferred to use a fluxing salt mixture composed of potassium chloride and sodium chloride in approximately equal quantities (between 40-60% KCl and 60-40% NaCl) with NaF and/or KF added thereto in total amount of up to 3%. In general, mixtures of soluble metal salts such as sodium, potassium, calcium, magnesium, iron and manganese chlorides, having a melting point below 710° C., can be used in carrying out the process of the present invention. The achieved results are improved (where its presence does not lead to the precipitation of an insoluble material) by the addition of a small amount of alkali metal fluoride, as already mentioned above. However in many situations the use of fluorides is undesirable because of their known toxicity and very good results can be obtained without the inclusion of a fluoride in the fluxing salt.

Scrap bales are usually partially opened to allow the fluxing salt solution to cover the surfaces of the scrap. A surface active agent is normally included to assist in achieving coverage. However the deposition of fluxing salts on the scrap can be performed while the scrap is still in the bale. To afford further assistance in achieving coverage the baled scrap, in somewhat heated condition, may be immersed in a cold bath of the fluxing salt so that the fluxing salt solution is sucked into the interstices of the bale.

Alternatively, when scrap has been reduced to individual shreds in a shredding machine, the shreds may be passed under a series of spraying heads to deposit the fluxing salt solution on the shreds in the form of fine droplets. The salt solution is preferably at a relatively elevated temperature, since this decreases the viscosity of the salt solution, particularly where the concentration of the salt solution is high, for example 25-35% and increases the effectiveness of any contained surface active agent in spreading the salt solution, particularly where the scrap is dirty or oily. The shreds also may be somewhat warmed to assist entry of the salt solution into folded shreds.

The invention is further described below with reference to the following examples.

EXAMPLE 1

In order to test the effectiveness of the invention scrap sheet of an Al 2% Mg alloy was employed. This sheet was 0.25 mm thick and was coated on both sides; one side with a clear lacquer and the other side with a pigmented coating.

The sheet, in bale form, was divided into 50 kgm lots for each test. Burning-off the coating, after deposition of the fluxing salt solution, was carried out in conventional manner in a refractory crucible at a controlled temperature of 550° C. and with a restricted air supply. As each batch of baled sheet was heated the temperature rise was recorded and in all cases the sheet reached 550° C. after one hour. The batch of scrap was held at this temperature to ensure that all the coating had been burnt off; usually 15-30 minutes was required to ensure adequate removal of carbon.

Three concentrations of fluxing salt solution were used, namely 4% (2% NaCl 2% KCl), 35% (17½% NaCl 17½% KCl) and 37% (17½% NaCl 17½% KCl 2% NaF). The baled coated sheet was immersed in these solutions, in which there was a wetting agent (for example a small quantity of Teepol (Registered Trade Mark) sufficient to give good penetration and wetting of the baled scrap). The baled scrap was then drained before burning-off the coating. From the loss of solution in the bath it was estimated that the salt left on the sheet after immersion was 0.2%, 1% and 1% respectively of the metal weight, from the solutions of the above noted strengths. The percentage of flux deposited, based on the weight of the metal, varies with the thickness of the metal.

Melting of the burned-off scrap was carried out in an electric resistance crucible furnace. 15 kg of 99.0% Al ingot was melted in the crucible to form a body of molten metal at 750° C. The scrap sheet was added to this as fast as possible and pushed into the molten metal. Melting 50 kg of scrap sheet and heating to 710° C. took three hours, so that some sheet was above the metal for about 20 minutes before immersion. The temperature of the molten metal was recorded during each trial and it was found that melting times were very consistent.

After melting, the dross and metal were stirred and then a settling time of 15 minutes was given. After settlement the dross was removed with a perforated ladle which is normal practice with this type of melt, normally being performed in the side well of a conventional gas-fired reverberatory furnace.

In these tests batches of scrap were immersed, before burning-off, in the three different salt flux solutions mentioned above and other batches were melted under a cover flux of the same composition and added in an amount of 2% by weight of charge. Also batches of raw scrap and untreated burnt-off scrap were melted as control batches.

The results are recorded in the following table. It should be noted in relation to these results that metal recovered in the furnace is of more economic significance than metal recovered in the dross.

TABLE 1

| Treatment | Metal Temp. °C. | Furnace Metal Recovery % | Metal in Dross % | Overall Metal Recovery % | Recovered Metal Cleanness Oxide Films No./kg |
|---|---|---|---|---|---|
| None | 710 | 76.3 | 82.5 | 98.4 | 556 |
| Coating burnt off | 690 | 77.2 | 79.5 | 99.4 | 504 |
| Immersed in 4% salt solution. | | | | | |
| Coating burnt off | 710 | 80.8 | 67.7 | 95.8 | 157 |
| Immersed in 35% salt solution. | 680 | 61.0 | 75.8 | 98.6 | 65 |
| Coating burnt off | 710 | 85.1 | 55.6 | 96.1 | 22 |
| Immersed in 35% salt solution + 2% NaF. | 710 | 91.4 | 51.1 | 97.9 | 60 |
| Coating burnt off Melted under chloride cover flux. 2% wgt of charge | 710 | 85.2 | 67.1 | 99.0 | 248 |
| Coating burnt off. Melted under chloride + NaF cover flux. 2% weight of charge | 710 | 85.7 | 43.2 | 93.8 | 285 |

Chloride cover flux was 50:50 NaCl:KCl with optional addition of 5% NaF

The figures in the final column of the above Table 1 are obtained by a Pressure Filtration test and are an indication of the cleanliness of the metal. In the test a known amount of molten metal is taken and filtered, using applied pressure, through a porous refractory plate. The filter residue is examined microscopically and its oxide films content assessed. The test is necessarily arbitrary but with experience gives a very good indication of the 'cleanliness' of the metal. Figures of 75 films/kg or less represent a very good standard of 'cleanliness' for an Al 2% Mg alloy and metal of that cleanliness is acceptable for rolling or extrusion without further removal of oxide by filtration.

Consideration of the tabulated results show that the effect of the fluxing salt solution treatment was to improve the furnace metal recovery as long as the melt temperature reached 710° C. Below that temperature there was excessive metal entrapped in the dross. The 4% salt solution increased the recovery from 76.3% to 80.8% of the metal recovered in the furnace (ignoring the metal content of the dross) and the 35% salt solution treatment increased it to 85.1%. The addition of 2% NaF to the 35% salt solution gave a further increase in metal recovery in the furnace to 91.4%. This improvement in metal recovery was primarily due to better separation of metal from the dross.

The use of a molten flux in a conventional way on top of the molten metal gave a similar result to the 35% salt solution (no fluoride) but at least 2% salt flux was used as opposed to approximately 1% on the salt solution-treated material. The addition of fluoride to such conventional flux did not appear to give any appreciable improvement in metal recovery, whereas the presence of sodium fluoride in the fluxing salt solution can be seen to have contributed a significant improvement.

The presence of chloride salts (with or without fluoride) in the furnace, whether it was added as a molten flux or as a salt coating on the sheet, completely changed the type of dross present. A sludgy dross was obtained when no chloride was present. The metal in this could not be drained through a vibrated perforated ladle. The dross from the metal where chloride had been added was much 'drier' and the metal content was reduced from above about 75% to 68% or lower, for example, down to about 50% when the metal temperature was sufficiently high and the weight of flux deposited was of the order of 1% of the metal. Good draining of metal was obtained through the perforated ladle. Fire assay results showed that the addition of fluxing chloride salts to the melt reduced the amount of entrapped metal in the dross so long as the melt temperature was 710° C. It is known that chloride in fact reduces the surface tension between aluminium and aluminium oxide to some extent. The addition of fluoride to the salt solution did not affect the metal content of the dross (unless the dross burnt as occurred in the final treatment in Table 1). It is possible that burning the dross in a reverberatory furnace would cause some draining of metal back into the melt before dross removal.

The overall recoverable metal was calculated by adding the metal recovery of Column 1 to the amount of metal that could be extracted from the dross in comparison with the total amount of metal used in the experiment. It appears that the salt solution immersion increases the furnace metal recovery but may lead to a slightly lower figure for overall metal recovery. However furnace metal recovery is the major significant factor.

Probably the most significant result of the salt solution treatment was its effect on metal cleanliness. Pressure Filtration test results showed that the 4% salt solution treatment reduces the oxide films per kg from 504 to 157 and the somewhat larger quantity of fluxing salt, resulting from immersion in a 35% salt solution gave a further reduction of 22-65 oxide film/kg; fluoride addition gave no further improvement in this respect. The 2% molten cover flux was not as effective in this respect as the salt solution treatment.

As already stated the deposition of a solution of fluxing salts on coated aluminium scrap before it is subjected to burning-off is found to have significant advantages in the burning-off procedure. It is in fact found that the presence of the salt flux on the coated scrap permits the use of a lower burn-off temperature and/or a shorter burn-off time with consequent economy.

EXAMPLE 2

A 50-kg lot of coated scrap of the same alloy as in Example 1 was immersed in a 35% solution of a 50:50 NaCl/KCl mixture and was then burnt-off at 350° C., 450° C. and 550° C. in a treatment time of 1½ hours, including time required to heat to temperature.

The decoated material was then melted in an electric resistance crucible under the same conditions as in Example 1. The results are recorded in the following Table 2 in which they are contrasted with the equivalent results taken from Table 1.

TABLE 2

|  | Metal Temp. °C. | Furnace Metal Recovery % | Metal in Dross % | Overall Metal Recovery % | Recovered Metal Cleanness Oxide Films No/kg |
|---|---|---|---|---|---|
| Immersed in 35% salt solution (50% NaCl 50% KCl) Coating burnt off at 350° C. | 710 | 87.4 | 35.6 | 95.9 | 54 |
| Immersed in 35% salt solution (50% NaCl 50% KCl) Coating burnt off at 550° C. | 710 | 85.1 | 55.6 | 96.1 | 22 |
| Immersed in 35% salt solution (50% NaCl 50% KCl) Coating burnt off at 450° C. | 710 | 90.7 | 53.9 | 99.2 | 88 |

It will be seen that there was a further small improvement in furnace metal recovery and overall metal recovery, when the burn-off was performed at 450° C., as compared with 550° C., as conventionally employed. Accordingly it is preferred to perform the burn-off at a temperature in the range of 400°–500° C., particularly where burn-off is carried out as a batch operation.

In each case in Table 2 the recovered metal had an adequate metal cleanliness to allow reuse without further treatment for removal of oxide inclusions.

In the preceding examples the water soluble fluxing salt was an equal mixture of sodium chloride and potassium chloride with optionally a small proportion of sodium fluoride. However it is well known that mixtures of other water-soluble chloride salts melt at temperatures appreciably below the melting point of aluminium.

EXAMPLE 3

In order to test the effectiveness of other salt mixtures in the method of the present invention, panels were immersed in a 4% solution of the salt mixtures listed below and then subjected to burning-off at 550° C. under the conditions stated in Example 1. The burnt-off panels, which had been treated with the salt solution, were then immersed in a 10% sodium hydroxide solution at 60° C. for 3 minutes.

A vigorous attack on the metal under these conditions indicates that the salt flux has destroyed the inhibition to attack normally caused by the oxide film.

In the test the various salt mixtures were dissolved in a small amount of water (containing surface active agent).

The mixtures tested were:

|  | Composition | M. Pt. °C. |
|---|---|---|
| 1 | 50% NaCl } | 670 |

-continued

| | Composition | M. Pt. °C. |
|---|---|---|
| 2 | 50% KCl<br>49% NaCl<br>49% KCl<br>2% NaF | 650 |
| 3 | 82% CaCl$_2$<br>18% KCl | 620 |
| 4 | 40% CaCl$_2$<br>60% KCl | 580 |
| 5 | 50% CaCl$_2$<br>50% NaCl | 500 |
| 6 | 50% MgCl$_2$<br>50% CaCl$_2$ | 610 |
| 7 | 65% MgCl$_2$<br>35% KCl | 470 |
| 8 | 40% MgCl$_2$<br>60% KCl | 440 |
| 9 | 45% FeCl$_3$<br>55% NaCl | 380 |
| 10 | 60% MnCl$_2$<br>40% CaCl$_2$ | 580 |
| 11 | 65% MnCl$_2$<br>35% KCl | 450 |
| 12 | 30% MnCl$_2$<br>70% KCl | 430 |

All of the above compositions gave satisfactory results in the test, although compositions (3), (4) and (5) were less effective than the rest.

Composition (1) will almost always be preferred on grounds of economy, optionally with a small sodium fluoride addition. In some instances however it may be desirable to use a sodium-free composition to avoid sodium contamination of the metal.

In such circumstances compositions which contain chlorides and fluorides of magnesium and manganese may be selected.

What is claimed is:

1. In a process for the removal of an organic coating from aluminium alloy scrap by burning-off said coating, the improvement which comprises depositing on the surface of the scrap an aqueous solution of a fluxing salt before burning-off the said coating, said fluxing salt solution containing at least 4% of said fluxing salt, said fluxing salt comprising a mixture of metal halide salts which fuse at a temperature below 710° C. and are soluble in water in an amount of at least 4%.

2. A process according to claim 1 in which said fluxing salt is composed of at least 95% of a mixture of metal chlorides and up to 5% of at least one metal fluoride.

3. A process according to claim 1 in which said fluxing salt cmprises 40–60% KCl and 60–40% NaCl.

4. A process according to claim 1 in which said fluxing salt comprises at least 97% of a mixture of KCl and NaCl in relative proportions in the range of 3/2–⅔ and up to a total of 3% of KF and/or NaF.

* * * * *